US008578175B2

(12) United States Patent
Boivie et al.

(10) Patent No.: US 8,578,175 B2
(45) Date of Patent: Nov. 5, 2013

(54) SECURE OBJECT HAVING PROTECTED REGION, INTEGRITY TREE, AND UNPROTECTED REGION

(75) Inventors: Richard Harold Boivie, Hawthorne, NY (US); Peter T. Williams, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/033,367

(22) Filed: Feb. 23, 2011

(65) Prior Publication Data

US 2012/0216049 A1     Aug. 23, 2012

(51) Int. Cl.
*G06F 21/00*     (2013.01)

(52) U.S. Cl.
USPC ........................... 713/189; 713/156; 713/190

(58) Field of Classification Search
USPC .......................................... 713/187, 189, 190
See application file for complete search history.

(56) References Cited

U.S. PATENT DOCUMENTS

| | | | |
|---|---|---|---|
| 5,222,139 A * | 6/1993 | Takaragi et al. | 380/28 |
| 5,481,613 A | 1/1996 | Ford et al. | |
| 5,845,281 A | 12/1998 | Benson et al. | |
| 6,185,685 B1 | 2/2001 | Morgan et al. | |
| 6,397,331 B1 | 5/2002 | Ober et al. | |
| 6,523,118 B1 | 2/2003 | Buer | |
| 6,704,871 B1 | 3/2004 | Kaplan et al. | |
| 6,708,273 B1 | 3/2004 | Ober et al. | |
| 6,751,709 B2 | 6/2004 | Seidl et al. | |
| 6,968,420 B1 | 11/2005 | Giles et al. | |
| 7,167,956 B1 | 1/2007 | Wright et al. | |
| 7,249,225 B1 | 7/2007 | Seidl et al. | |
| 7,290,288 B2 | 10/2007 | Gregg et al. | |
| 7,483,930 B1 | 1/2009 | Wright et al. | |
| 8,055,910 B2 | 11/2011 | Kocher et al. | |
| 8,108,641 B2 | 1/2012 | Goss et al. | |
| 2001/0010722 A1* | 8/2001 | Enari | 380/277 |
| 2001/0050990 A1 | 12/2001 | Sudia | |
| 2002/0064283 A1 | 5/2002 | Parenty | |
| 2002/0172368 A1 | 11/2002 | Peterka | |
| 2004/0123127 A1* | 6/2004 | Teicher et al. | 713/193 |
| 2004/0139346 A1 | 7/2004 | Watt et al. | |
| 2004/0181303 A1 | 9/2004 | Walmsley | |

(Continued)

FOREIGN PATENT DOCUMENTS

| | | |
|---|---|---|
| JP | 2006-227777 | 8/2006 |
| WO | WO 98/54633 A1 | 12/1998 |
| WO | WO-2008003833 A1 | 1/2008 |

OTHER PUBLICATIONS

Haifeng, "Memory Confidentiality and Integrity Protection Method Based on Variable Length Counter", 2012, IEEE, p. 290-294.*

(Continued)

*Primary Examiner* — Taghi Arani
*Assistant Examiner* — Gregory Lane
(74) *Attorney, Agent, or Firm* — Daniel P. Morris; McGinn IP Law Group, Pll

(57) ABSTRACT

A method and structure for a secure object, as tangibly embodied in a computer-readable storage medium. The secure object includes a cryptographically protected region containing at least one of code and data, an initial integrity tree that protects an integrity of contents of the cryptographically protected region; and an unprotected region that includes a loader, an esm (enter secure mode) instruction, and one or more communication buffers.

25 Claims, 9 Drawing Sheets

(56) References Cited

U.S. PATENT DOCUMENTS

| | | | |
|---|---|---|---|
| 2005/0038998 A1 | 2/2005 | Ueno et al. | |
| 2005/0044390 A1* | 2/2005 | Trostle | 713/188 |
| 2005/0076226 A1* | 4/2005 | Boivie et al. | 713/187 |
| 2005/0105738 A1 | 5/2005 | Hashimoto | |
| 2005/0166069 A1 | 7/2005 | Hashimoto et al. | |
| 2005/0177742 A1 | 8/2005 | Benson et al. | |
| 2006/0156418 A1 | 7/2006 | Polozoff | |
| 2007/0047735 A1 | 3/2007 | Celli et al. | |
| 2007/0101124 A1 | 5/2007 | Pitts | |
| 2007/0133795 A1 | 6/2007 | Kahn et al. | |
| 2008/0155273 A1* | 6/2008 | Conti | 713/190 |
| 2008/0222420 A1 | 9/2008 | Serret-Avila | |
| 2008/0288786 A1* | 11/2008 | Fiske | 713/190 |
| 2009/0006796 A1* | 1/2009 | Chang et al. | 711/163 |
| 2009/0006864 A1* | 1/2009 | Hashimoto et al. | 713/190 |
| 2009/0217385 A1 | 8/2009 | Teow et al. | |
| 2009/0300366 A1 | 12/2009 | Gueller et al. | |
| 2009/0319782 A1* | 12/2009 | Lee | 713/156 |
| 2010/0119068 A1 | 5/2010 | Harris | |
| 2010/0281273 A1* | 11/2010 | Lee et al. | 713/190 |
| 2011/0064217 A1* | 3/2011 | Fry et al. | 380/46 |

OTHER PUBLICATIONS

Henry Levy, Capability-Based Computer Systems, Published by Digital Press 1984. http://www.cs.washington.edu/homes/levy/capabook.

Theodore A. Linden, Operating System Structure to Support Security and Reliable Software, Institute for Computer Sciences and Technology, National Bureau of Standards, Washington, DC 20234 http://delivery.acm.org/10.1145/360000/356682/P409.linden.pdf—Abstract Only ACM Computing Survey (CSUR), vol. 8, Issue 4, Dec. 1976.

Canetti, et al., "A Two Layers Approach for Securing an Object Store Network", Proceedings of the First International IEEE Security in Storage Work-Shop (2002) (SISW'02), 1-14.

Wang, et al., "Keep Passwords Away from Memory: Password Caching and Verification Using TPM", $22^{nd}$ International Conference on Advanced Information Networking and Applications, IEEE, 755-762, DOI: 10.1109/AINA, 2008.109.

Catrein, et al. "Private Domains in Networks of Information", IEEE International Conference Communications (ICC) Work-Shops, 2009. 1-5.

PCT Notification of Transmittal of the International Search Report and the Written Opinion of the International Searching Authority, or the Declaration dated Oct. 1, 2010.

Williams, et al., "CPU Support for Secure Executables", The $4^{th}$ International Conference on Trust and Trustworthy Computing, Jun. 22-24, 2011, Pittsburgh, PA.

Williams, et al., "CPU Support for Secure Executables" Stony Brook University, Power Point Presentation at the $4^{th}$ International Conference on Trust and Trustworthy Computing, Jun. 22-24, 2011, Pittsburgh, PA.

Frincke, D.; "Developing Secure Objects"; Google; 1995-1996.

Somogyi, et al.; :NbIDL: Secure, Object-oriented, Client-Server Middleware; Google; 1998.

SAP Functions in Detail-; "Crystal Reports Server—A Functional Overview"; Google; 2008.

United States Office Action dated Mar. 26, 2012 in U.S. Appl. No. 12/492,738.

PCT Notification Concerning Transmittal of International Preliminary Report on Patentability dated Jan. 12, 2012. (PCT Application No. PCT/US2010/001811).

United States Office Action dated Nov. 20, 2012 in U.S. Appl. No. 13/033,455.

United States Office Action dated Mar. 18, 2013 in U.S. Appl. No. 12/878,696.

United States Office Action dated Jun. 5, 2013 in U.S. Appl. No. 12/492,738.

United States Office Action dated Aug. 14, 2013 in U.S. Appl. No. 13/226,079.

United States Office Action dated Aug. 14, 2013 in U.S. Appl. No. 12/492,738.

\* cited by examiner

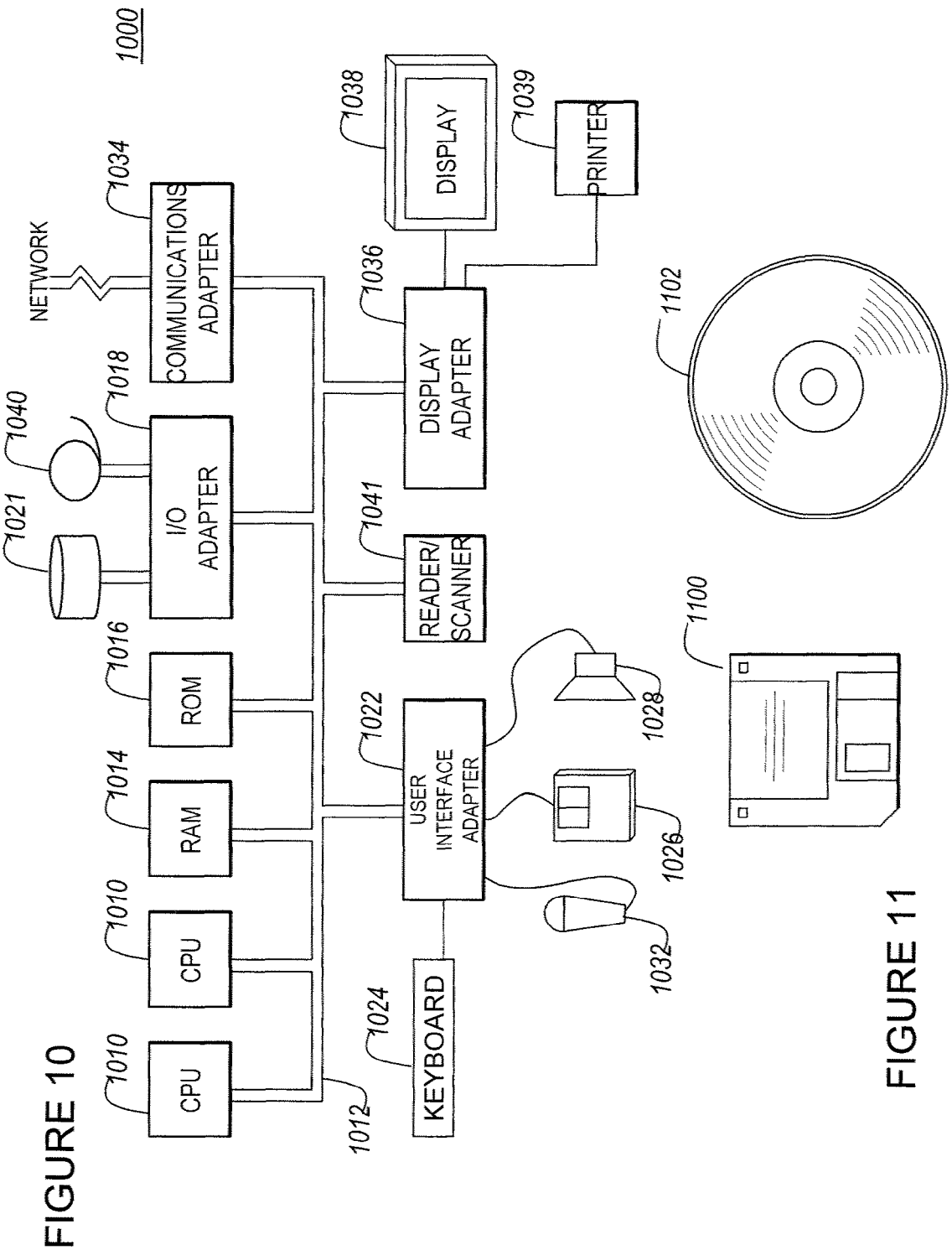

SECURE OBJECT HAVING PROTECTED REGION, INTEGRITY TREE, AND UNPROTECTED REGION

CROSS-REFERENCE TO RELATED APPLICATIONS

The present Application is related to the following co-pending applications:

U.S. patent application Ser. No. 12/492,738, filed on Jun. 26, 2009, to Richard H. Boivie, entitled "SUPPORT FOR SECURE OBJECTS IN A COMPUTER SYSTEM", and U.S. patent application Ser. No. 12/878,696, filed on Sep. 9, 2010, to Richard H. Boivie, entitled "CACHE STRUCTURE FOR A COMPUTER SYSTEM PROVIDING SUPPORT FOR SECURE OBJECTS", both of which are incorporated herein by reference.

The present Application is also related to U.S. patent application Ser. No. 13/033,455, to Boivie, et al., entitled "BUILDING AND DISTRIBUTING SECURE OBJECT SOFTWARE", filed concurrently herewith.

BACKGROUND OF THE INVENTION

1. Field of the Invention

The present invention generally relates to security on a computer. More specifically, in a system based on secure objects that protect software code and data from other software within a system, a method for constructing such secure objects permits a build machine to construct a secure object for a target machine without having the target machine's system key that is used in decrypting the secure object for execution on the target machine.

2. Description of the Related Art

The first co-pending patent application introduced the concept of a 'Secure Object' comprising code and data for a computer system that is cryptographically protected from other software on the system, and a computer architecture for supporting such Secure Objects. The co-pending patent application also defined the notion of a handle for a Secure Object containing information that is specific to the Secure Object that is encrypted under the 'System Key' of the system on which the Secure Object will run. The co-pending patent application additionally described a method for building and distributing Secure Object-based software with these encrypted handles.

FIG. 1 shows the system 100 described in this co-pending application, in which a crypto engine 102 associated with a microprocessor 101 decrypts an encrypted secure object retrieved from memory 103 by the CPU 104 for execution of the secure object. When Secure Object information is returned to memory, the secure object information is again encrypted by the crypto engine 102 prior to storage in memory 103. The decryption/encryption in the crypto engine 102 uses keys 105 retrieved from a protected area 106 in the CPU 104.

In the method described in the co-pending application, the machine on which the software is built, i.e., the build machine, 'knows' the System Key of the target machine, meaning that the System Key of the target machine has been stored in the build machine, and encrypts Secure Object handles under that System Key. This method has two disadvantages. First, it requires the build machine to know the System Key of the target machine—which is not desirable. Second, it implies that either all the target machines must have the same system key or the build machine must send a slightly different version of the Secure Object-based software to each of the target machines.

The present inventors have recognized that a need exists to improve the method of enhancing security on a computer using the previously-described secure object mechanism and, more particularly, the need to securely permit one machine, the "build machine", to construct a secure object for another machine, the "target machine" in such a way that the build machine does not need to know the System Key of the target machine.

SUMMARY OF THE INVENTION

In view of the foregoing, and other, exemplary problems, drawbacks, and disadvantages of the conventional systems, the present application describes an improved method for building and distributing Secure Object-based software that overcomes these disadvantages.

In a first exemplary aspect, described herein is a secure object, as tangibly embodied in a computer-readable storage medium, the secure object including: a cryptographically protected region containing at least one of code and data; an initial integrity tree that protects an integrity of contents of the cryptographically protected region; and an unprotected region that includes a loader, an esm (enter secure mode) instruction, and one or more communication buffers.

In a second exemplary aspect, also described herein is a central processing unit (CPU) on a computer, the CPU comprising a support mechanism for an esm (enter secure mode) instruction for causing the CPU: to execute a secure object, the esm instruction using a system key to decrypt an operand and then uses the decrypted operand to load an encryption key register that enables the CPU to decrypt an encrypted secure object as portions of the secure object move from an external memory into the CPU; and to load a root of an initial integrity tree.

In a third exemplary aspect, also described herein is a CPU (central processing unit) that includes support for an esm instruction that uses a system key to decrypt an operand that uses one encryption key for code, the code key and a separate encryption key for data, the data key.

In a fourth exemplary aspect, also described herein is a computer capable of executing a program of instructions for building a secure object, as tangibly embodied in a computer-readable storage medium, the secure object including a cryptographically protected region containing at least one of code and data; an initial integrity tree that protects an integrity of contents of the cryptographically protected region; and an unprotected region that includes a loader, an esm (enter secure mode) instruction, and one or more communication buffers, the secure object using at least one of the communication buffers to communicate with other entities such as an operating system or a remote entity, wherein the program of instructions leverages wrapper functions to invoke system calls and copy contents of buffers between the protected and unprotected regions in a way that is transparent to the secure object software while allowing the secure object to intelligibly communicate with remote systems.

Thus, the present invention provides mechanisms in which computer security is enhanced by permitting a build machine to construct secure objects for a target machine without having the target machine's system key that is used in decrypting the secure object for execution on the target machine.

BRIEF DESCRIPTION OF THE DRAWINGS

The foregoing and other purposes, aspects and advantages will be better understood from the following detailed description of an exemplary embodiment of the invention with reference to the drawings, in which:

FIG. 10 shows an exemplary computer system 1000 that can be used to implement the concepts of the present invention, as modified to incorporate the hardware and/or software described herein; and FIG. 11 exemplarily shows a computer-readable memory device that can be used to store the concepts of the present invention, as embodied in computer-readable instructions for execution on a computer.

EXEMPLARY EMBODIMENTS OF THE INVENTION

Figure 1:
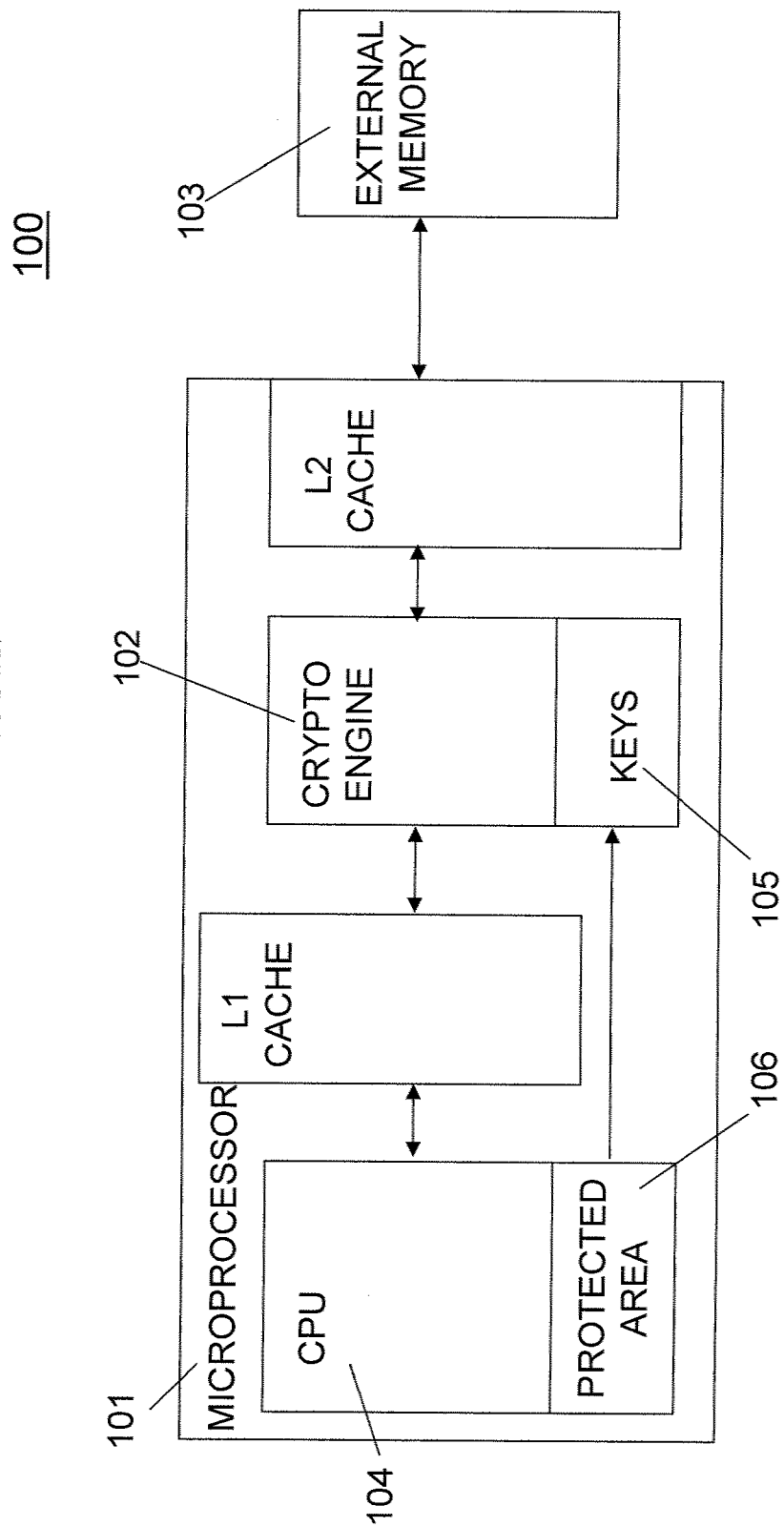
FIG. 1 shows exemplarily the concept 100 of secure objects.

Referring now to the drawings, and more particularly to FIGS. 1-11, exemplary embodiments of the method and structures of the present invention will now be described.

In the improved method described by the present application, the build machine does not know the System key of the target machine(s).

Rather, in a first exemplary embodiment, the improved method makes use of a special Deployment Server (DS) process on the target machine. The DS will be a Secure Object-based secure process that protects sensitive information including the System Key of the target machine and the Secure Object-based software that it receives from the build machine. The build machine will securely send the software to the DS process via standard communications security mechanisms, such as SSL (Secure Sockets Layer) or TLS (Transport Layer Security) that provide cryptographic protection for network communications. The DS will then generate an encryption key for each of the Secure Objects in the received software and encrypt each Secure Object under its key. The handle for each Secure Object including the object's encryption key will then be encrypted under the System Key.

In this way, the received Secure Object-based software will be protected by the communications security mechanisms until it is safely inside the DS Secure Object-based secure process and it will be protected by the DS secure process until the Secure Objects and handles have been encrypted. Once the Secure Objects and handles have been encrypted, the Secure Object-based software can be safely installed in the file system. Thus the Secure Object-based software is always protected from the time it leaves the build machine until it is safely installed in the file system on the target machine with no point of vulnerability anywhere along the way. Note that the DS could also use digital certificates and/or public keys to validate a digital signature on received software to ensure that any software received is from a legitimate trusted party. Since the DS process is itself a Secure Object-based secure process, the integrity of these digital certificates and public keys would be protected from tampering.

The DS process itself will be built and installed on a system at "system build time", in a secure environment where the system is not subject to physical or software attack.

In this secure environment:

the system is manufactured;

it is loaded with standard (cleartext) software including OS, middleware, applications, etc.;

the DS process is compiled and linked; and then encrypted and installed as discussed below.

An encryption key is generated for the DS Secure Object and the DS Secure Object is encrypted under this encryption key.

A system key is generated for the new system.

This key is written into the system's 'System Key' register, which is not accessible by software but which is used by the CPU hardware in the processing of an esm instruction. (At run-time the esm instruction will be used to 'Enter Secure Mode.' As discussed in the co-pending patent application, the esm instruction enables a Secure Object's sensitive information to be decrypted on the path from external memory into the CPU and encrypted on the path from CPU to external memory.)

This System Key is also used to encrypt the handles in the DS process.

Once the handles are encrypted under the System Key, the DS code can be installed on the system and the system can be shipped, and then installed and run in the desired run-time environment.

Additional Secure Object-based software can then be sent to the system's DS process and installed by the DS as discussed previously.

Thus, in the first exemplary embodiment, the build machine does not know the System key of the target machine, and does not need to know this System key, because it is the target machine that actually completes the construction of the Secure Object that was originated by the build machine.

In an alternative design, an exemplary second embodiment, conventional public key cryptography can be used to encrypt and decrypt Secure Object handles. In this design, the system key that the target machine uses to decrypt the handle (or esm operand) is the private key of a public key pair and the build machine encrypts the handle/esm operand with the corresponding public key. In this alternative design, the build machine does not need to know the target machine's system key and the DS process can be eliminated but the build machine must send a slightly different executable to each of the target machines. In this exemplary design, the build machine:

1. chooses the Secure Object keys,
2. encrypts Secure Objects under those keys,
3. uses the public key of the target machine to encrypt Secure Object handles, and
4. sends the Secure Object-based software to the target machine.

At execution time on the target machine, in the processing of an esm instruction, the CPU hardware decrypts the handle (the operand of the esm instruction) using the private key of the target machine which it obtains from the 'System Key' register. The private key is installed on the target machine at "system build time" in a secure environment when the system is manufactured.

In either the design of the first exemplary embodiment or the second exemplary embodiment, the System Key register is writeable but not readable by software. Since a write to the System Key register can make existing Secure Object software unusable, the operation could be limited to a small amount of trusted software such as software that knows the current value of the System Key, such as the DS process discussed above. The instruction for writing the System Key register might take two operands: one for the current value of the System Key and one for the new value. The write operation would only succeed if the first operand matches the current value stored in the System Key register.

It is further noted that in either the first or second exemplary embodiments, when the build machine builds secure object software for a target machine, the building is done in a secure environment, meaning that the both the secure object under construction and the construction process itself are not subject to physical or software attack.

Figure 2:
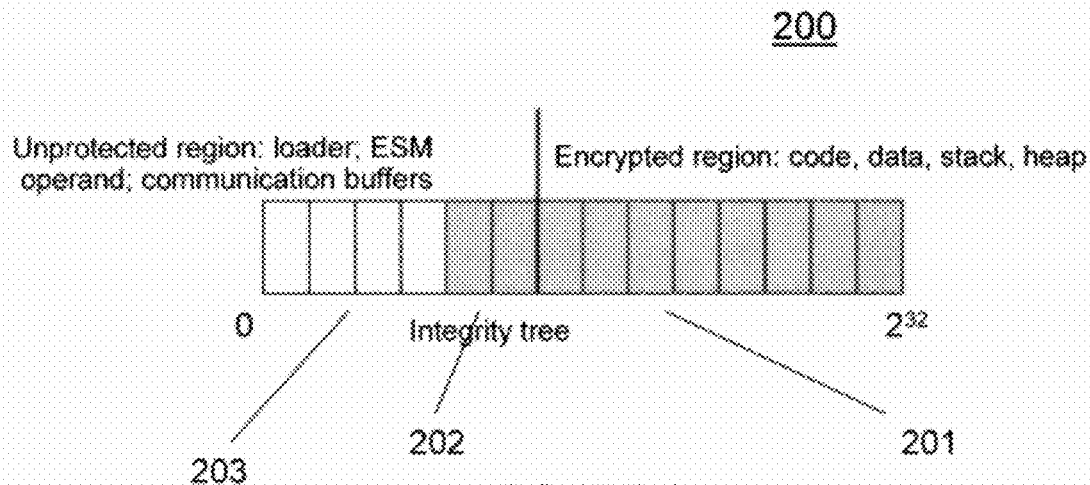
FIG. 2 shows exemplarily a format and content 200 for an executable file that includes secure object-based software.

To further clarify the exemplary methods of the present invention, FIG. 2 illustrates an exemplary format of an executable file 200 that includes Secure Object-based software. The file contains (1) the Secure Object code and data in encrypted form 201, (2) the initial version of an integrity tree 202 that will be used at run-time to protect the integrity of the Secure Object's code and data, and (3) loader code including an esm instruction (in 203) to 'Enter Secure Mode'. As discussed in the first co-pending patent application above, the esm instruction allows a Secure Object's sensitive information to be decrypted on the path from external memory into the CPU and encrypted on the path from CPU to external memory.

FIG. 2 also shows communication buffers in the unprotected region 203. These will be discussed in more detail below. Thus, in FIG. 2, the unshaded region 203 of the binary file is an unprotected region that includes a loader, the esm instruction including the esm operand (or handle), and communication buffers. The shaded regions include the integrity tree 202 and the encrypted region 201 that includes one or more of code, data, stack, and heap data. This file might be in a standard executable format, such as ELF. The code and data are encrypted so that only the target CPU can read the binary, and only in secure mode.

The binary file for the secure object contains the encrypted code and data 201 of the secure object, the initial integrity tree 202, and the unprotected region 203 including communication buffers, the loader code and the esm instruction that will be used to enter secure mode at run-time.

Figure 3:
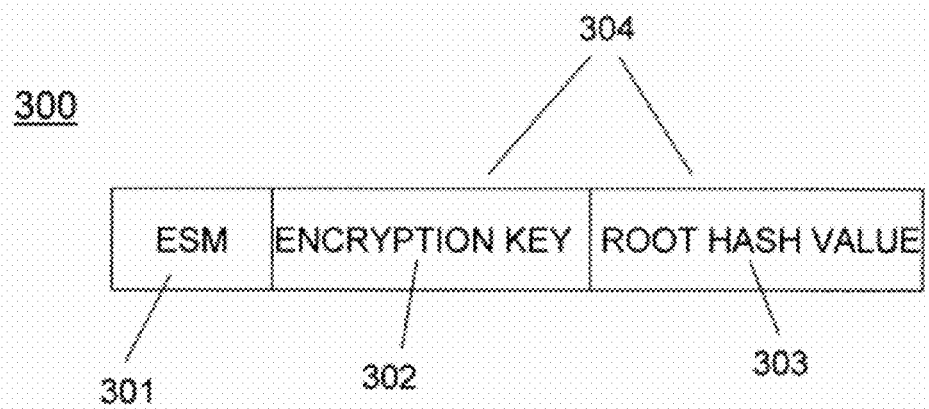
FIG. 3 shows an exemplary implementation 300 of the esm instruction.

FIG. 3 illustrates an exemplary implementation of the esm instruction 300 that is used to enter secure mode. The esm instruction has an operand 304 that includes in encrypted form the encryption key 302 that is used to decrypt and encrypt Secure Object code and data as that information moves between the CPU and external memory and the initial value 303 of the root of the hash tree that protects the integrity of the Secure Object code and data. At run-time, this operand is decrypted using the System Key of the target machine. In the first design discussed above, the System Key is a secret key. In the alternative design discussed above, the System Key is the private key of a public key pair.

Thus, the esm instruction 300 loads the encryption key used for decryption/encryption of the secure object, loads the root hash value that will be used with the hash tree in the cleartext region to protect the integrity of the secure object. The esm instruction also assigns an object ID ("OID") that the CPU and the operating system can use to refer to this secure object as discussed below.

It is noted that the protection of integrity using the hash tree approach is further discussed in a co-pending application, U.S. patent application Ser. No. 10/677,933, to R. H. Boivie and W. E. Hall, entitled "Computing Device That Securely Runs Authorized Software", filed on Oct. 1, 2003, published Apr. 7, 2005, as US Patent Publication No. 2005/0076226, that is referred to in the first above-identified co-pending application. Contents of this co-pending application are also incorporated herein by reference.

Figure 4:
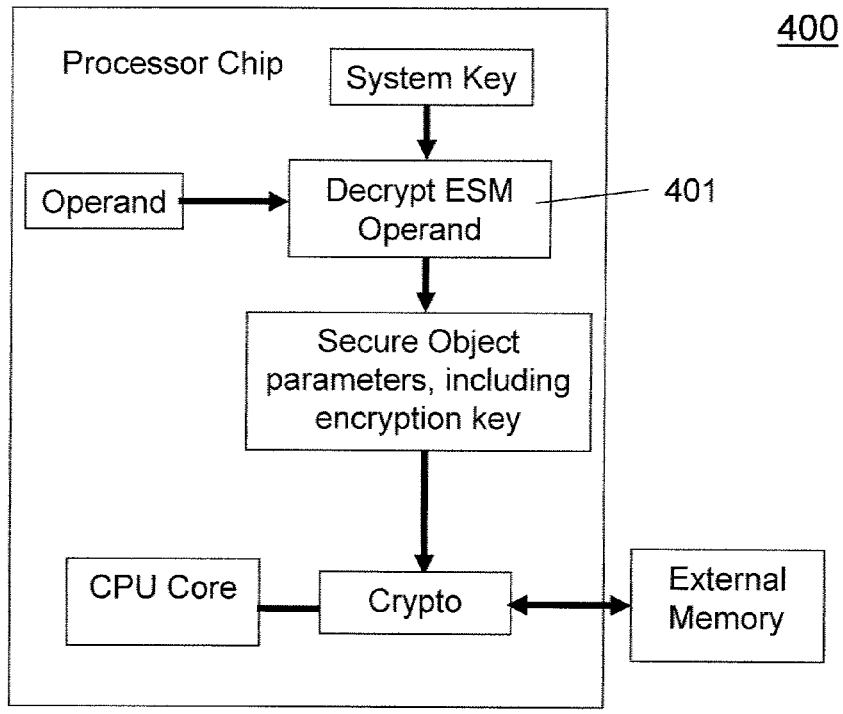
FIG. 4 shows an exemplary operation 400 of the esm instruction.

FIG. 4 illustrates the processing 400 that occurs during execution of the esm instruction, used to enter secure mode and load crypto keys. The secure object's keys are not "in the clear" in its esm instructions. Rather, as shown in step 401, the esm operand (or handle) is decrypted under the System Key, which, as discussed above may be a secret key or the private key of a public key pair. This decryption produces several Secure Object parameters including the encryption key for the Secure Object's code and data and the initial root of the hash tree. As noted in the figure, other software does not have access to the System Key and cannot decrypt the esm operand. And other software cannot use the Secure Object's operand without generating an integrity exception since the integrity tree ensures that only the unmodified Secure Object software can use that operand.

The esm instruction also allocates an Object-ID for the Secure Object and loads this value into an Object-ID register. This register stores the Object-ID of the currently running Secure Object or a special value, such as 0, if non-Secure Object code is running. The Object-ID is used by the CPU hardware e.g. to identify the owner of a cache line as discussed in the second co-pending patent application above, U.S. patent application Ser. No. 12/878,696, filed on Sep. 9, 2010, to Richard H. Boivie, entitled "CACHE STRUCTURE FOR A COMPUTER SYSTEM PROVIDING SUPPORT FOR SECURE OBJECTS". The Object-ID is also used by the operating system to refer to a (e.g., to run) a Secure Object.

Figure 5:
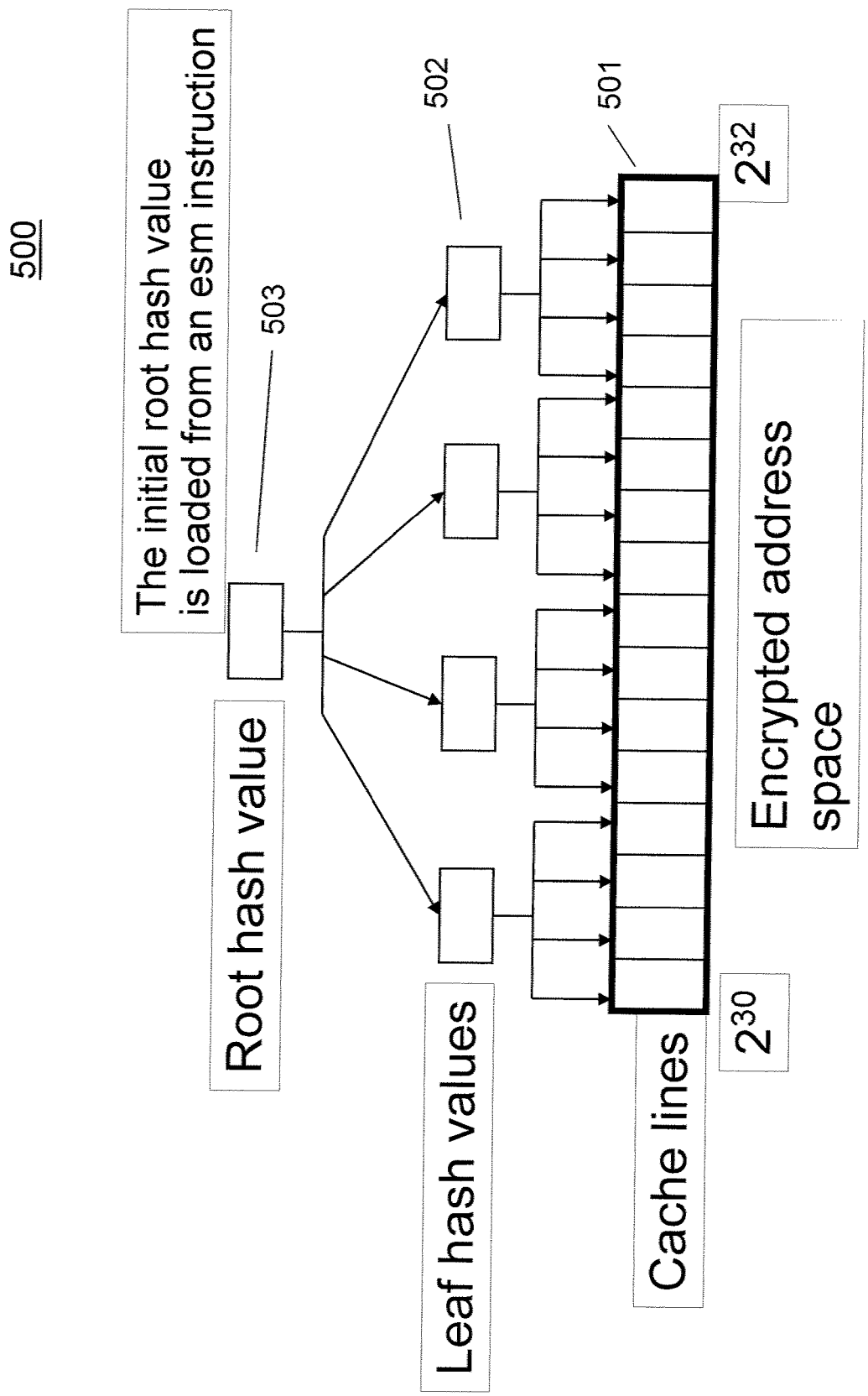
FIG. 5 shows exemplarily a hash tree 500 used to protect the integrity of a secure object's code and data.

FIG. 5 illustrates the hash tree that is used to protect the integrity of a Secure Object's code and data.

At the bottom 501 of the tree is the protected region of the Secure Object's address space, i.e., the portion of the address space that is cryptographically protected in FIG. 2. The protected region 501 is divided up into cache line size chunks and each of these chunks is protected by a hash value 502. These hash values 502 are, in turn, protected by other hash values and so on, up to a single root hash value 503.

Figure 6:
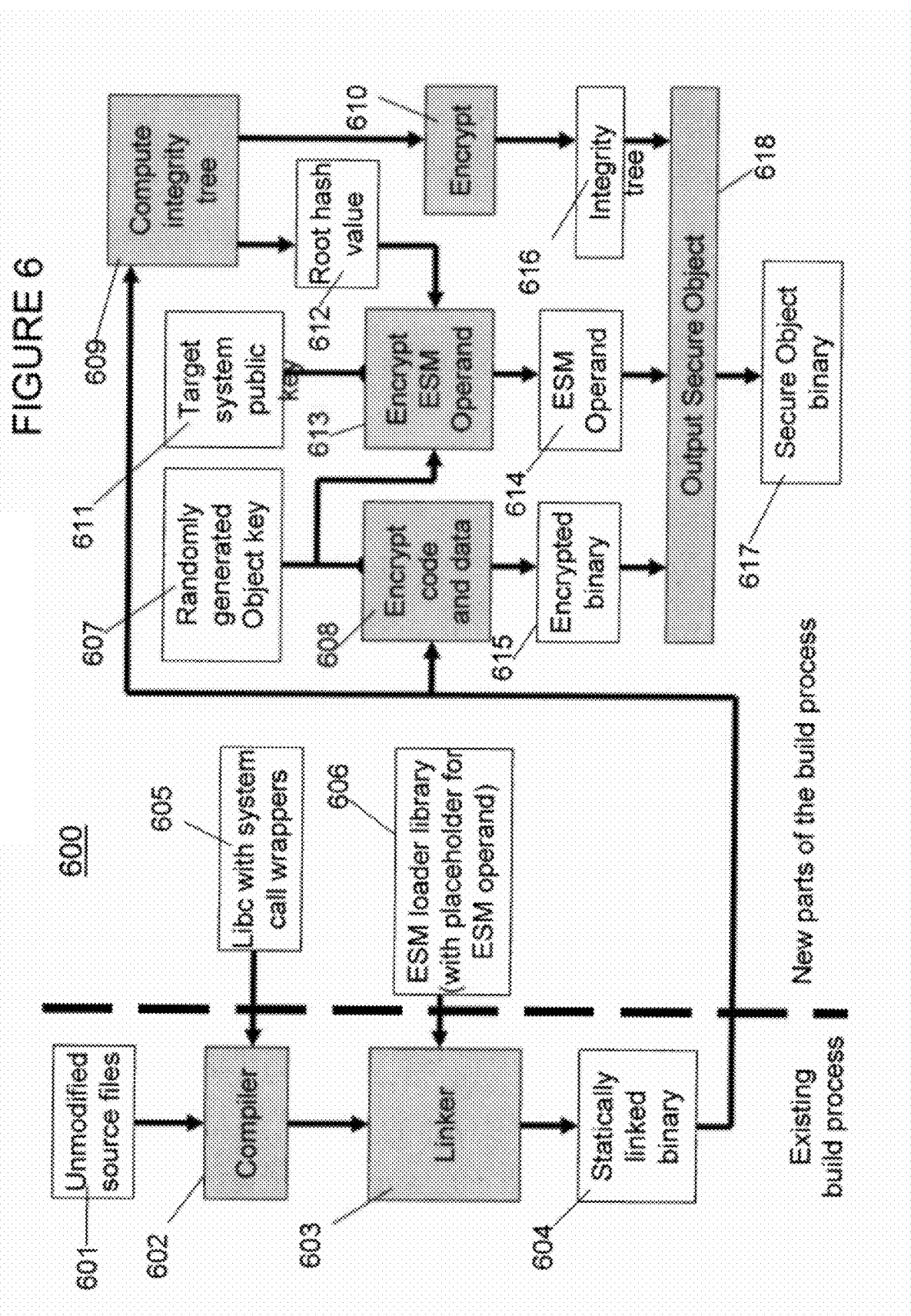
FIG. 6 shows an exemplary process 600 of building secure objects in accordance with a second exemplary embodiment of the present invention.

The initial values of the hash tree are computed at software build time, which is discussed in more detail in the discussion of FIG. 6. At execution time, the values from leaf to root are checked when a cache line size chunk is loaded into the cache from external memory. This checking ensures that no tampering has occurred. If the check detects an inconsistency, an integrity exception is generated.

When a dirty cache line is evicted from the cache, the values from leaf to root are updated appropriately. Although an adversary or malware may be able to store arbitrary values into the lower portions of the hash tree, the root of the tree is stored inside the CPU chip, where it is not subject to tampering. This method prevents an adversary from undetectably changing the memory (code or data) of a Secure Object. The initial root value is loaded into the CPU in the execution of an esm instruction (discussed in FIGS. 3 and 4) and the root value is saved and restored by the CPU hardware in a process context switch. Context switching and interrupt handling are discussed in more detail below.

Information in the cache is also protected, for example, by the method discussed in co-pending U.S. patent application Ser. No. 12/878,696, by Richard H. Boivie, entitled "Cache Structure For a Computer System Providing Support For Secure Objects", filed Sep. 9, 2010, and also incorporated herein by reference.

Since information in the cache cannot be tampered with, as discussed in the co-pending patent application, values in the cache can be trusted. Hash values need only be checked when a cache line moves from external memory into the cache and hash values need only be updated when a cache line moves from the cache to external memory. As discussed in co-pending application Ser. No. 12/878,696, cryptographic overhead can be minimized by storing values in on-chip caches in the clear and only performing decryption or encryption when information moves between the on-chip caches and external memory. Since crypto overhead as well as hash value integrity overhead only occurs when information moves between on-chip caches and external memory, as long as a Secure Object is getting cache hits, the performance overhead is zero.

Furthermore, since information in the cache is protected and can be assumed to be correct, when a cache line is brought into the cache, the checking of hash values on the path from leaf to root need only continue until a node is reached that is already in the cache.

Similarly, when a cache line is evicted, only its parent hash value needs to be updated if (or once) that value is in the cache.

Note that separate encryption keys and separate hash trees could be used to protect code and data. This would enable multiple executing instances of a given program to share code without sharing data. And, since compiled code is read-only and replay attacks (in which an adversary "replays" information that was previously valid but is not currently valid) are not an issue, the "hash tree" for protecting code could consist of a single level of hash values. Thus, at most, a single hash value would need to be checked when a cache line of code is brought into the cache and, since code is read-only, code hash values would never be updated at run-time or written back from the cache to external memory. The hash value for a code cache line would include some identification of the program that it belongs to as well as its virtual address to prevent relocation or "code-swapping" attacks.

As stated above, the data might be protected by an encryption key and a hash tree that are distinct from those used for the code. This might involve a data key that is generated at run-time and an additional "loader" in the protected code region that copies initialized data values from a region of memory protected by the code key to a region protected by the data key.

As mentioned above, FIG. 2 shows communication buffers in the unprotected region 203. These buffers, which are not protected by the Secure Object encryption, are used when information is to be passed to or received from another entity, such as a remote system, that does not have access to the Secure Object encryption key. Since these buffers are not protected by the Secure Object encryption, when this information is sent to a remote system, the remote system can "see" the same information that the Secure Object "sees". If the contents of a buffer were encrypted under the Secure Object encryption, a remote system receiving those contents would not be able to "see" the content that the Secure Object "sees".

Since the CPU decrypts information that moves from a protected region in external memory into the CPU and since the CPU does not encrypt information that moves from the CPU to an unprotected region in external memory, the act of copying information from the protected region to the unprotected region has the effect of decrypting the information. Information in this region can be sent to a remote system and the remote system will be able to read it.

Similarly the act of copying information from the unprotected region to the protected region has the effect of encrypting it under the Secure Object encryption key. This is useful when information is received from a remote entity.

Note that, although the unprotected region is not protected by the Secure Object encryption mechanism, information in that region can still be cryptographically protected. Standard communication mechanisms such as SSL or TLS can be used to provide end-to-end security. If, for example, a message that is to be sent to a remote system is encrypted under TLS before it is moved to the unprotected region, the message will be protected in the unprotected region by the same mechanism that protects it while the message is "in transit" traveling across a network.

If, at the receiving end, the message is moved to the protected region before the TLS decryption, the message will have strong protection end-to-end with no point of vulnerability along the way.

The keys that a Secure Object uses for TLS or other communications security (or for storing information securely in a file system) will be protected inside the Secure Object so other software including the operating system will not be able to access those keys or undetectably tamper with them.

System call "wrappers" can be linked with Secure Object software so that the Secure Object software does not need to know about the protected and unprotected regions. These "wrappers" are library functions that invoke the actual system calls and copy the contents of buffers between the protected and unprotected regions in a way that is transparent to the Secure Object software while allowing the Secure Object to communicate intelligibly with remote systems.

In addition to hiding some complexity from the programmer, the wrappers also allow us to convert existing software into Secure Object based software. This will be discussed in more detail in the discussion of FIG. 6.

FIG. 6 illustrates the process 600 of building Secure Object based software according to the alternative design discussed above. The shaded boxes in FIG. 6 show execution steps and unshaded boxes show calculated entities. A new or previously existing software program 601 is compiled 602 and linked 603 using existing tools and combined with the system call wrappers 605 discussed above. The software is also linked with a loader and an esm instruction 606 to form an initial executable binary, 604.

During execution, the loader referred to in the discussion of FIG. 2 will copy the encrypted code and data to an area in memory that will become the protected region and it will copy the hash tree, the communication buffers and the esm instruction to an area in memory that will become the unprotected region. The esm instruction 606 in the initial binary includes a placeholder for the esm operand which will be computed later in the build process. A randomly generated object key 607 is chosen and the Secure Object code and data is encrypted 608 under this object key 607. An initial hash tree that will be used at run-time to protect the integrity of the Secure Object code and data is computed 609 and encrypted 610. The object key 607, the root of the hash tree 612, and the bounds of the Secure Object's protected and unprotected regions are encrypted in 613 under the public key of the target system and this encrypted value is used as the operand 614 of the esm instruction. Then the encrypted binary 615, the esm operand 614, and the encrypted integrity tree 616 are combined to form the executable binary 617 shown in FIG. 2. This file 617 can be in a standard executable format such as ELF, which is then output in 618 by the build machine as a secure object.

One more comment about the hash tree. Since an executing program can grow in size at run-time by requesting additional memory from the operating system, the hash tree needs to be designed in such a way that it can accommodate this additional memory. This can be accomplished by using a sparse hash tree in which unused parts of the hash tree, i.e., hash tree nodes corresponding to unused portions of the address space, are not mapped to physical memory until they are actually used. If newly allocated memory is initialized to zero and if the hash of newly allocated memory is also zero, the size of an executing program, and its hash tree, can be "grown" dynamically at run-time, without "breaking" an existing hash tree.

In a Linux-based environment, the Linux overcommit mechanism can be used to map pages of virtual memory corresponding to hash tree nodes to physical pages only when they are actually accessed. When the CPU attempts to access a memory location that has not been mapped to physical memory, a page fault is thrown.

This behavior is equivalent to how the CPU handles accesses to unmapped locations outside the integrity tree region. Since the virtual address has been reserved by the secure executable process (with the mmap syscall), the OS handles this fault by assigning a physical page to this location. The OS does not need to be aware of the location or size of the integrity tree region—this page allocation is the default OS behavior. With overcommit enabled, the secure executable can allocate address space for the entire potential integrity tree at startup, without generating an exception, even though the allocated address space will not necessarily fit in physical memory.

As discussed above, the root of the hash tree must be saved and/or restored in a process context switch. The root and several other values are saved and restored by the CPU hardware so that the operating system cannot access or tamper with these values. When an interrupt occurs, in addition to the root, the Secure Object's encryption key is saved (or encryption keys, if separate code and data keys are used, as discussed previously) as well as the contents of the general-purpose registers (GPRs). These are saved by the CPU hardware in a Secure Object Table on the CPU chip that is not accessible by software. Alternatively, the CPU can store these values in the protected portion of the Secure Object's address space.

The GPRs are also cleared before the interrupt handler is invoked so any sensitive information that was in the GPRs at the time of the interrupt is protected from the interrupt handlers, device drivers, and the operating system. The Object-ID of the interrupted Secure Object is also available in a register. The operating system will use this value later on to restore and run the interrupted Secure Object.

A new instruction, restorecontext, which has one operand, an Object-ID, restores a Secure Object's root, encryption key(s), and GPRs from the Secure Object Table (or alternatively from the protected portion of the Secure Object's address space discussed above) and resumes execution of the Secure Object. Another instruction, clearcontext, which also has an Object-ID operand, is used by the operating system when a Secure Object exits to clear and free an entry in the Secure Object Table so that that entry can be (re)used by another Secure Object.

To allow for a large number of concurrently-executing Secure Objects, entries in the on-chip Secure Object Table can be encrypted and moved to memory and later on moved back from memory to the on-chip Secure Object Table and decrypted. These operations would be done via two new instructions, SaveSOTentry and RestoreSOTentry, using keys that are known only by the CPU hardware.

Figure 7:
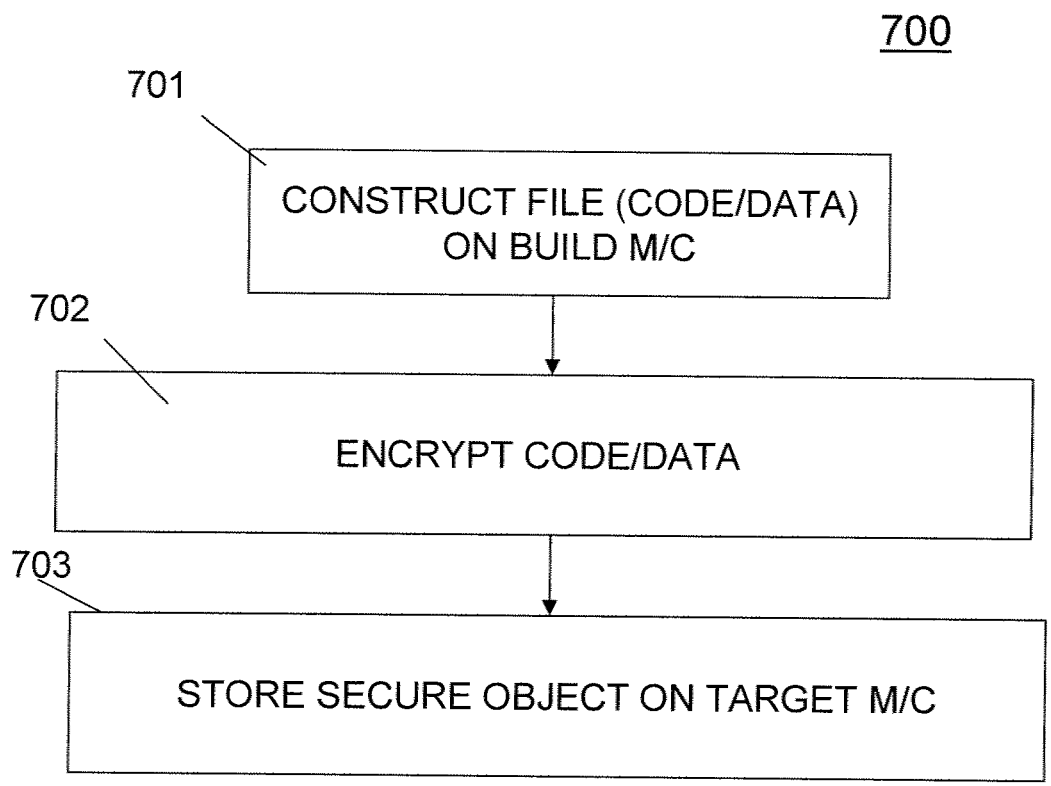
FIG. 7 shows in a simple flowchart format 700 the general concepts of the present invention.
Figure 8:
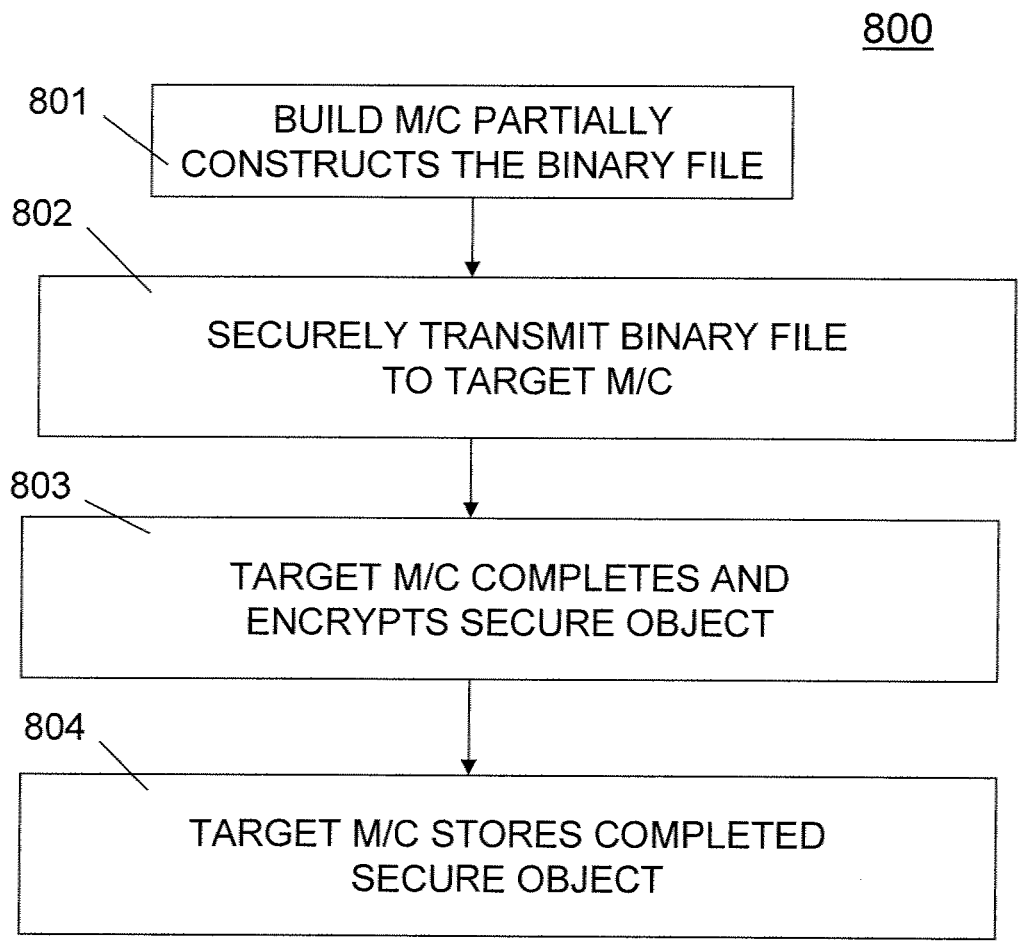
FIG. 8 shows in a simple flowchart format 800 how the first exemplary embodiment is exemplarily implemented.
Figure 9:
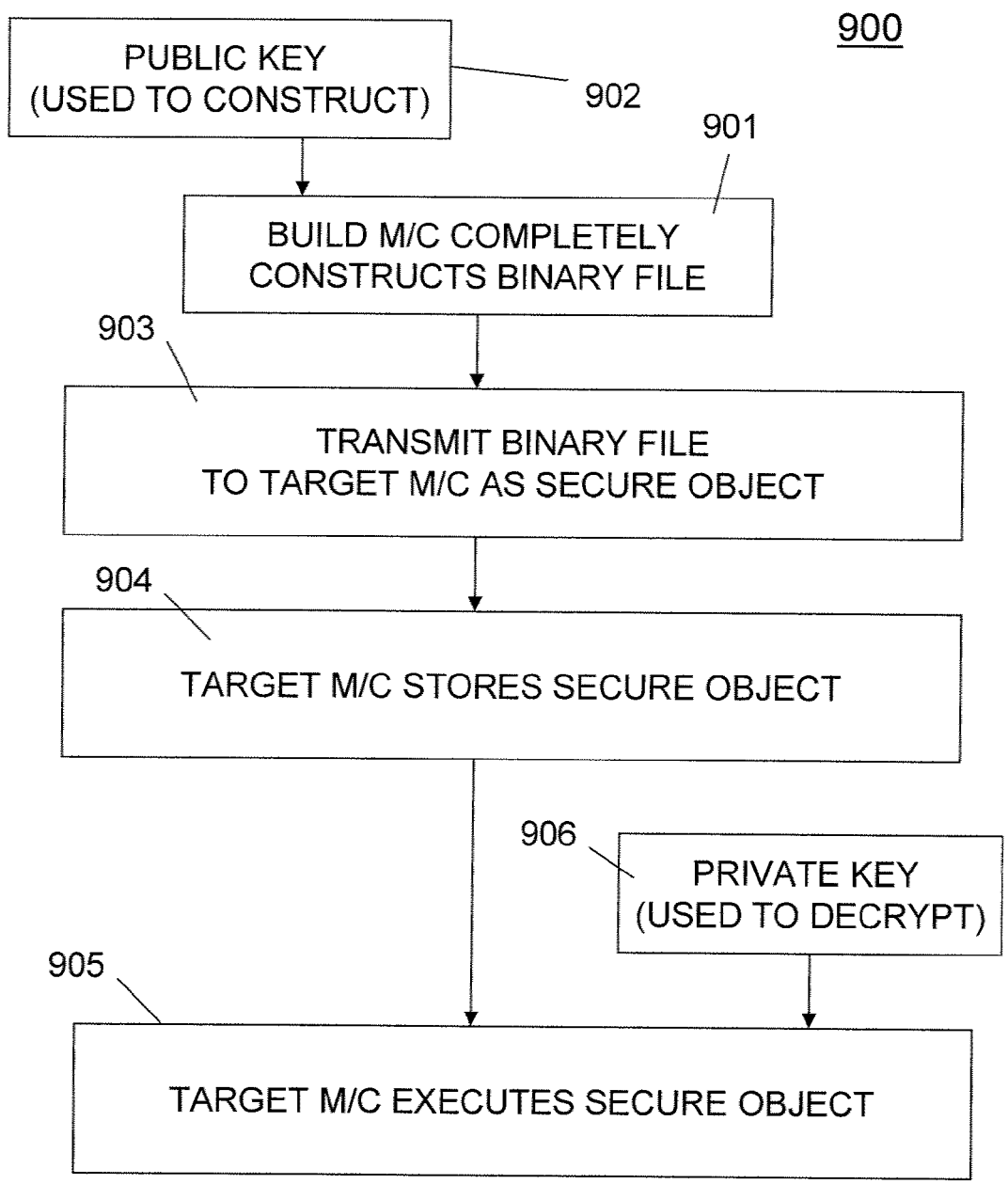
FIG. 9 shows in a simple flowchart format 900 how the second exemplary embodiment is exemplarily implemented.

To summarize the above-described methods, FIGS. 7-9 show in simple flowchart formats the steps of the exemplary embodiments, including the generic process 700 shown in FIG. 7. In step 701 of FIG. 7, the build machine constructs a binary file including code and/or data, which is then encrypted in step 702, and stored, in step 703 as a secure object by the target machine. A key feature of the present invention is that the build machine does not need to know the system key of the target machine.

FIG. 8 shows a simple flowchart 800 of the first exemplary embodiment in which the build machine only partially constructs the binary file in step 801, which partial binary file is then securely transmitted to the target machine in step 802. In step 803, the target machine then completes construction by encrypting the partially-constructed secure object, using its system key, and, in step 804, stores the secure object.

FIG. 9 shows a simple flowchart 900 of the second exemplary embodiment, in which the build machine, in step 901, uses the public key 902 of the target machine to completely construct the binary file, which is then transmitted to the target machine in step 903, and the target machine then stores, in step 904 the completed secure object that has been encrypted using the target machine's public key.

The target machine can then retrieve the stored secure object and execute it, in step 905, using the private key 906 of the target machine's public/private key pair as the system key to decrypt the esm operand of the secure object.

Thus, under either the first or second exemplary embodiments, a build machine can construct and transmit a secure object to a target machine without any knowledge of the target machine's system key.

Exemplary Hardware Implementation

FIG. 10 illustrates a typical hardware configuration of an information handling/computer system in accordance with the invention and which preferably has at least one processor or central processing unit (CPU) 1010.

The CPUs 1010 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1010 and hardware above, to perform the method of the invention.

This signal-bearing media may include, for example, a RAM contained within the CPU 1010, as represented by the fast-access storage for example. Alternatively, the instructions may be contained in another signal-bearing media, such as a magnetic data storage diskette 1100 (FIG. 11), directly or indirectly accessible by the CPU 1010.

Whether contained in the diskette 1100, the computer/CPU 1010, or elsewhere, the instructions may be stored on a variety of non-transitory machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM 1102, WORM, DVD, digital optical tape, etc.), paper "punch" cards, or other suitable non-transitory signal-bearing storage media including storage devices in transmission media, communication links, and wireless, and including such formats as digital and analog. In an illustrative embodiment of the invention, the machine-readable instructions may comprise software object code.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A secure object that is protected against other software on a system, as tangibly embodied in a non-transitory computer-readable storage medium, said secure object comprising:
a cryptographically protected region containing at least one of code and data;
an initial integrity tree that protects an integrity of contents of the cryptographically protected region; and
an unprotected region that includes a loader, an esm (enter secure mode) instruction, and one or more communication buffers,
wherein said secure object is constructed using a build machine, different from a target machine that will implement said secure object, said esm instruction including an encrypted operand that can be decrypted via a system key of said target machine, and
wherein said encrypted operand includes, in encrypted form, bounds of said protected and unprotected regions.

2. The secure object of claim 1, wherein said loader comprises a software coding that causes a processor to copy at least one of said esm instruction and at least one said communication buffer to an area in a memory that will become an unencrypted memory region.

3. The secure object of claim 1, wherein said encrypted operand comprises in encrypted form:
a cryptographic key that can be used to decrypt said cryptographically protected region; and
a root of said initial integrity tree.

4. The secure object of claim 1, wherein the loader comprises a software coding that causes a processor to copy at least one of said code and said data to an area in a memory that will become a cryptographically protected memory region.

5. The secure object of claim 3, wherein an execution of said esm instruction:
uses a system key to decrypt said operand to obtain said cryptographic key and said root from the decryption of said operand;
loads said cryptographic key into a register that will be used to decrypt contents of a memory as said contents move from said memory to a CPU (central processing unit) and to encrypt said contents as said contents move from said CPU to said memory; and
loads said root into a register that is used in conjunction with said integrity tree in integrity checking as data moves between said CPU and an external memory.

6. The secure object of claim 1, wherein an execution of said esm instruction:
uses a system key to decrypt said operand to obtain said cryptographic key, said root and said bounds;
loads said cryptographic key into a register that will be used to decrypt contents of a memory as said contents move from said memory to a CPU (central processing unit) and encrypt said contents as said contents move from said CPU to said memory;
loads said root into a register that is used in conjunction with said integrity tree in integrity checking; and
loads said bounds into registers that are used to bound the memory areas that are subject to at least one of encryption, decryption, and integrity checking.

7. A secure object that is protected against other software on a system, as tangibly embodied in a non-transitory computer-readable storage medium, said secure object comprising:
a cryptographically protected region containing at least one of code and data
an initial integrity tree that protects an integrity of contents of the cryptographically protected region; and
an unprotected region that includes a loader, an esm (enter secure mode) instruction, and one or more communication buffers,
wherein said secure object is constructed using a build machine, different from a target machine that will implement said secure object, said esm instruction including an encrypted operand that can be decrypted via a system key of said target machine, and
wherein an execution of said esm instruction allocates a secure object id that at least one of a CPU (central processing unit) and an operating system can use as a reference to said secure object.

8. The secure object of claim 7, wherein said allocated secure object id is used to identify a secure object that owns a given cache line.

9. The secure object of claim 7, wherein said allocated secure object id is used by an operating system to refer to (e.g., to run) said secure object.

10. The secure object of claim 1, wherein said loader executes the esm instruction.

11. The secure object of claim 1 that uses a communication buffer in said unprotected region to communicate with other entities, including at least one of an operating system and a remote entity.

12. A central processing unit (CPU) on a computer, said CPU comprising a support mechanism for an esm (enter secure mode) instruction for causing said CPU:
to execute a secure object, said esm instruction using a system key to decrypt an operand and then uses the decrypted operand to load an encryption key register that enables the CPU to decrypt an encrypted secure object as portions of said secure object move from an external memory into the CPU; and
to load a root of an initial integrity tree,
wherein the esm instruction allocates a secure object id that at least one of the CPU and an operating system (OS) can use as a reference to said secure object.

13. The CPU of claim 12 that includes an interrupt handling mechanism that saves important state information when a secure object is interrupted, including:
- at least one of said encryption key and a current value of the root of an integrity tree; and
- values of general purpose registers.

14. The CPU of claim 13 that includes a restorecontext instruction that restores said state information and resumes execution of a specified secure object.

15. The CPU of claim 12 that includes a clearcontext instruction that frees CPU resources associated with a specified secure object.

16. The CPU of claim 12 that includes an instruction for writing a system key register that holds said system key.

17. The CPU of claim 16 wherein said instruction comprises two operands, one corresponding to a current value of the system key register and one corresponding to a new value of the system key register wherein the write operation would only succeed if an operand corresponding to the current value of the system key register matches the current value stored in said system key register.

18. The CPU of claim 12 wherein information stored in a CPU cache is stored in the clear to avoid cryptographic overhead on cache hits.

19. The CPU of claim 18 wherein integrity values are checked before information is loaded into a CPU cache so that in-cache information can be trusted and integrity checking can be avoided on cache hits.

20. The CPU of claim 12 wherein a cache line is labeled with the id of the secure object that owns the cache line and other software is denied access to the contents of said cache line.

21. The CPU of claim 19 wherein the integrity values for information to be loaded into the cache are checked along a path from information to be loaded to the root of the integrity tree.

22. The CPU of claim 21 wherein integrity checking on the path to the root stops when one of the following occurs:
- an integrity failure is detected;
- the root of the integrity tree is reached; and
- a value that is already in the cache is reached.

23. The CPU of claim 19 wherein when a dirty cache line moves from CPU cache to external memory the value of the cache line is encrypted and at least one integrity value is updated.

24. A computer capable of executing a program of instructions for building a secure object as tangibly embodied in a non-transitory computer-readable storage medium, said secure object comprising:
- a cryptographically protected region containing at least one of code and data;
- an initial integrity tree that protects an integrity of contents of the cryptographically protected region; and
- an unprotected region that includes a loader, an esm (enter secure mode) instruction, and one or more communication buffers, said secure object using at least one of said communication buffers to communicate with other entities, including at least one of an operating system and a remote entity,
- wherein said program of instructions leverages wrapper functions to invoke system calls and copy contents of buffers between said protected and unprotected regions in a way that is transparent to the secure object software while allowing the secure object to intelligibly communicate with remote systems.

25. The computer of claim 24, wherein wrapper functions and an esm instruction are linked with an application program so that an application program can be made into a secure object without any changes to said application program and without any changes to programming languages, compilers, or link-editors.

* * * * *